United States Patent Office 3,345,292
Patented Oct. 3, 1967

3,345,292
ALKYLDIARYL SULFIDES CONTAINING A STABILIZER
Alan Jeffrey Neale, Llangollen, and Terence James Rawlings, Wrexham, Wales, assignors to Monsanto Chemicals Limited, London, England, a British company
No Drawing. Filed Nov. 9, 1964, Ser. No. 409,973
Claims priority, application Great Britain, Nov. 12, 1963, 44,603/63
6 Claims. (Cl. 252—47)

ABSTRACT OF THE DISCLOSURE

Stabilized alkyl-substituted diaryl sulfides where the stabilizer can be a diarylamine or an alkylated phenol.

---

This invention relates to thermally stable compositions and their use as functional fluids, for example as high temperature lubricants.

In modern technology there is a demand for material that remains stable for prolonged periods at temperatures of perhaps 300–400° C. Liquids having the required properties can be employed, for example, as heat transfer fluids or as hydraulic fluids or lubricants in systems that are required to operate at high temperatures.

The present invention comprises the use as a functional fluid, for example, as a heat transfer fluid, hydraulic fluid or lubricant, composition comprising an alkyldiaryl sulfide, that is to say a compound having two aryl nuclei linked through a sulfur atom and in which an alkyl group is present as a nuclear substituent and an antioxidant. Also part of the invention is an apparatus or system, for example a heat transfer system or hydraulic system, in which such compositions are used as functional fluids.

The preferred alkyldiaryl sulfides are those in which there is present as a nuclear substituent an alkyl group that contains 6 or more carbon atoms. The compounds can contain one or more such alkyl groups and optionally other additional nuclear substituents can be present, for example an alkyl group containing fewer than 6 carbon atoms, such as a methyl, isopropyl or t-butyl group, or a halogen atom, for instance a fluorine, chlorine or bromine atom.

For use as lubricants, alkyldiaryl sulfides having a single alkyl group containing 6 or more carbon atoms are preferred. The single alkyl group can be in the o-, m- or p-position relative to the sulfur linkage, but the p-alkyl compounds sometimes show advantages.

Each aryl nucleus in the alkyldiaryl sulfide is preferably a phenyl nucleus, though one or both can be, for example, a naphthyl or biphenylyl nucleus.

Where the alkyldiaryl sulfide is one of the preferred class in which there is present an alkyl group containing 6 or more carbon atoms, the carbon atoms can be arranged in a straight or branched chain. The optimum size of the alkyl group depends on the particular use to which the alkyldiaryl sulfide is to be put, but the alkyl group is often preferably one containing from 6 to about 20 carbon atoms. Examples of such groups are n-hexyl, n-octyl, n-nonyl, 2-ethylhexyl, 2,2,4-trimethylpentyl, n-decyl, iso-decyl, n-dodecyl, n-tetradecyl, n-hexadecyl and n-octadecyl.

Specific examples of new alkyldiaryl sulfides that are useful according to the present invention are 4-n-hexyldiphenyl sulfide; 2-n-octyldiphenyl sulfide; 4-n-octyldiphenyl sulfide; 4,4'-di-n-octyldiphenyl sulfide; 4-n-octyl-2-t-butyldiphenyl sulfide; 4-n-octylphenyl diphenylyl sulfide; 4-n-octyl-3,3'-dichlorodiphenyl sulfide; 4-(2,2,4-trimethyl-pentyl) diphenyl sulfide; 4-n-dodecyldiphenyl sulfide and 4-n-octadecyldiphenyl sulfide.

In the compositions of the present invention, a single alkyldiaryl sulfide can be used or a mixture of two or more alkyldiaryl sulfides can be used. Other materials can also be present depending on the particular use for which the fluid is required. Where the alkyldiaryl sulfide is used as a lubricant for example, it can contain such additives as pour-point depressants, viscosity modifiers and load-carriers, for example triaryl phosphates or chlorinated polyphenyls.

The performance of an alkyldiaryl sulfide as a functional fluid can be improved by incorporating in it an antioxidant to give the thermally stable compositions of this invention. Preferred antioxidants are phenolic or amine materials, and each of these types comprises a wide range of compounds from which an antioxidant can be selected.

Phenolic antioxidants include for example alkylated phenols containing a single phenol nucleus and compounds containing two alkylated phenol nuclei linked through an alkylene group or a sulfur atom.

Amine antioxidants include for example diarylamines such as for instance diphenylamine derivatives and phenyl naphthylamines, dihydroquinoline derivatives, and phenylenediamines such as for instance N,N'-diaryl-, N,N'-dialkyl- and N-aryl-N'-alkyl-p-phenylene diamines.

The amount of antioxidant in the composition is generally a relatively small proportion of the total weight of the composition, being sufficient to inhibit its oxidative degradation. The amount does in fact depend on the particular antioxidant chosen, but there is in general a minimum proportion below which increases in the amount of antioxidant do not significantly add to its effectiveness. The practical range of antioxidant proportions is generally from about 0.05 to about 5% of the total weight of the composition, especially from about 0.1 to about 1%, for example 0.2, 0.5 or 0.75%.

Specific examples of phenolic antioxidants that can be used in compositions of the invention are: 2,6-di-t-butyl-4-methylphenol; 2,4-bis($\alpha$-methylbenzyl) phenol; 2,2'-methylenebis(4-methyl-6-t-butylphenol); and 2,2'-methylenebis[4-methyl-6(2-methylcyclohexyl)phenol].

Specific examples of amine antioxidants that can be used in the compositions of this invention are: 4-isopropoxydiphenylamine; phenyl $\beta$-naphthylamine; polymerized 2,2,4-trimethyl-1,2-dihydroquinoline; 6-ethoxy-2,2,4-trimethyl-1,2-dihydroquinoline; N,N'-diphenyl-p-phenylenediamine; N,N'-bis(1-ethyl-3-methylpentyl)-p-phenylenediamine; N-cyclohexyl-N'-phenyl-p-phenylenediamine and N-isopropyl-N'-phenyl-p-phenylenediamine. A composition of this invention can contain two or more different aryl disulfides and more than one antioxidant can be present.

A preferred method for the production of the new diaryl sulfides particularly those having a straight chain alkyl group as a nuclear substituent, comprises the reaction of a diaryl sulfide starting material with an alkanoic acid halide in the presence of a Friedel-Crafts catalyst to give an alkanoyl diaryl sulfide which is then converted to the corresponding alkyl diaryl sulfide by reaction with a suitable reducing agent, for example hydrazine hydrate, zinc and hydrochloric acid or lithium aluminium hydride. The number of carbon atoms and their arrangement in the alkanoic acid halide that is reacted with the diaryl sulfide starting material is of course the same as in the alkyl group that is to be introduced into the diaryl sulfide nucleus. For example, the production of a n-hexyl diaryl sulfide requires the use of an n-hexanoyl halide and the production of an n-octyl diaryl sulfide an n-octanoyl halide.

Preferred alkanoic acid halides are the acid chlorides, and a preferred Friedel-Crafts catalyst is aluminium chloride.

The preparation of the instant sulfides is illustrated by the following example.

*Example*

A solution of 48.5 grams (0.26 mol) of diphenyl sulfide and 42.5 grams (0.26 mol) of n-octanoyl chloride in 100 cc. of carbon disulfide was kept at a temperature of 0° C. while 34.8 grams (0.26 mol) of powdered aluminium chloride were added gradually, with stirring, over a period of 1½ hours. The mixture was then allowed to warm to room temperature, was stirred for a further 3 hours, and was then poured into a mixture of ice and hydrochloric acid. After the ice had melted, the organic phase was separated and was washed successively with water, dilute sodium carbonate solution and water. After separating the final water wash, the organic phase was dried over anhydrous calcium chloride. The calcium chloride was then removed by filtration, and the filtrate was distilled, first at atmospheric pressure to remove the carbon disulfide solvent, and then under reduced pressure to give 59.6 grams of 4-n-octanoyl diphenyl sulfide as a pale yellow oil having a boiling point of 194–196° C. at a pressure of 0.075 mm. of mercury. The oil subsequently solidified to a solid having a melting point of 31–33° C. after crystallization from ethanol.

A mixture of 50 grams (0.16 mol) of 4-n-octanoyldiphenyl sulfide, 18.2 grams (0.36 mol) of 100% hydrazine hydrate and 180 cc. of diethylene glycol were stirred for 1 hour at 80° C. in a flask fitted with a reflux condenser. 17.3 grams (0.43 mol) of powdered sodium hydroxide were then added, and the temperature of the mixture was raised to 200° C., excess hydrazine hydrate and water being allowed to distill out. After stirring for a further 3 hours at this temperature, the mixture was cooled and poured into water. Organic material was extracted into ether, and the ether extracts were washed and dried. Removal of the ether from the extracts gave a residue which was distilled under reduced pressure to yield 33.5 grams of 4-n-octyldiphenyl sulfide as a pale yellow oil having a boiling point of 200–203° C. at a pressure of 1.3 mm. of mercury. (Found: C, 80.10; H, 9.3; S, 10.76%. $C_{20}H_{26}S$ requires C, 80.47; H, 8.78; S, 10.74%.) The freezing point of 4-n-octyldiphenyl sulfide was −40° C., and its viscosity at −30° C. was 410 centistokes.

The thermal stability of 4-n-octyldiphenyl sulfide was determined by the isoteniscope method of Blake (J. Chem. Eng. Data, 1961, 6, 87). The decomposition temperature of 4-n-octyldiphenyl sulfide, defined as the temperature at which the rate of isothermal vapor pressure increase is 0.84 mm. of mercury per minute, was 335° C.

The compositions of this invention were tested for oxidation stability using a method which consisted in passing dry air at a rate of 250 ml. per minute through a 50 ml. sample of the test composition at a constant temperature of 175° C. for 192 hours. The sample was contained in a glass tube similar to a conventional "boiling tube." The tube and its contents were weighed before and after the test to determine the weight loss. After the second of these weighings, fresh material was added to the sample in the tube to bring the volume up to 50 ml. and the tube was then reheated at 175° C. for several minutes to redissolve or partially redissolve any precipitate that had formed. Viscosity measurement, and acidity and benzene-insoluble determinations were then carried out on the liquid (or suspension) so obtained.

The results are given in the following table. The table also includes for comparison the results obtained on bis(2-ethylhexyl) sebacate and two established lubricant formulations based on sebacate esters. Two sets of figures are shown where determinations were carried out in duplicate.

| Test Composition | Viscosity at 100° F. (cs.) | | Weight Loss, percent | Acidity, mgms. KOH/g. | Insolubles (percent) |
|---|---|---|---|---|---|
| | Initial | Final | | | |
| 4-n-octyldiphenyl sulfide | 8.52 | 15.7 | 26 | 7.4 | 0.01 |
| | 8.52 | 20.1 | 22.3 | 7.65 | 0.00 |
| 4-n-octyldiphenyl sulfide plus 0.5% by weight of N-isopropyl-N'-phenyl-p-phenylenediamine | 8.63 | 9.96 | 12.2 | 0.13 | 0.03 |
| | | | | 0.10 | 0.03 |
| 4-n-octyldiphenyl sulfide plus 0.5% by weight of 2,2'-methylenebis[4-methyl-6-(2-methylcyclohexyl)-phenol] | 8.63 | 13.2 | 10 | 0.22 | 0.01 |
| | | | | 0.22 | 0.04 |
| Bis(2-ethylhexyl) sebacate | 12.3 | 61.1 | 49.3 | 5.44 | 0.01 |
| RR1 (EATO 35)[1] | 36.1 | 40.3 | 4.8 | 7.85 | 0.325 |
| | 36.1 | 40.4 | 6.3 | 7.11 | 0.421 |
| RR2 (ETO 15)[2] | 13.6 | 14.7 | 14.5 | 2.98 | 0.339 |
| | 13.6 | 14.7 | 12 | 2.28 | 0.307 |

[1] An oil based on a sebacate ester and containing a complex sebacate as thickener and a phenothiazine as antioxidant.
[2] An oil based on a sebacate ester and containing tricresyl phosphate and a phenothiazine.

The lower the viscosity increase, weight loss, acidity developed and insoluble material formed, the more satisfactory is the fluid. In respect of acidity and insoluble material, the antioxidant-containing 4-n-octyldiphenyl sulfide formulations are seen to be considerably superior to the established sebacate ester lubricants. It is also to be noted that the claimed additives function not only as antioxidants but also as anti-corrosion agents.

What is claimed is:

1. A composition comprising a major amount of an alkyl-substituted diaryl sulfide optionally further substituted with one or more members of the group consisting of hydrocarbyl and halogen and in an amount sufficient to improve the oxidation resistance of said sulfide of an antioxidant selected from the group consisting of a diaryl amine and an alkylated phenol.

2. A composition of claim 1 in which the alkyl portion of said alkyl-substituted diaryl sulfide contains from 6 to 20 carbon atoms.

3. A composition of claim 1 where the antioxidant is a phenylenediamine.

4. A composition of claim 1 where the alkyl-substituted diaryl sulfide is 4-n-octyldiphenyl sulfide and the antioxidant is present in an amount of from about 0.05% to about 5% by weight and is N-isopropyl-N'-phenyl-p-phenylenediamine.

5. A composition of claim 1 where the alkyl-substituted diaryl sulfide is 4-n-octyldiphenyl sulfide and the antioxidant is present in an amount of from about 0.05% to about 5% by weight and is 2,2'-methylenebis[4-methyl-6-(2-methylcyclohexyl) phenol].

6. A composition of claim 3 where the phenylenediamine is an N,N'-dialkyl-p-phenylenediamine.

References Cited

UNITED STATES PATENTS

| | | | |
|---|---|---|---|
| 2,629,693 | 2/1953 | Barton et al. | 252—45 X |
| 2,666,743 | 1/1954 | Brennan | 252—33.6 |
| 2,718,501 | 9/1955 | Harle | 252—47 |

OTHER REFERENCES

Extreme Pressure Lubricating Properties of Same Sulfides, Davey et al. Wear vol. 1 (1957–58) pp. 291–304.

Oxidation of Organic Sulfides, Bateman et al. Chemical Society Jour. 1955 part 2, pp. 1596–1603.

DANIEL E. WYMAN, *Primary Examiner.*

W. H. CANNON, *Assistant Examiner.*